United States Patent [19]
Davis

[11] Patent Number: 5,377,225
[45] Date of Patent: Dec. 27, 1994

[54] MULTIPLE-ACCESS NOISE REJECTION FILTER FOR Á DS-CDMA SYSTEM

[75] Inventor: Mark E. Davis, Carlsbad, Calif.

[73] Assignee: Hughes Aircraft Company, Los Angeles, Calif.

[21] Appl. No.: 139,957

[22] Filed: Oct. 19, 1993

[51] Int. Cl.⁵ .......................................... H04L 27/30
[52] U.S. Cl. ....................................................... 375/1
[58] Field of Search ........................................... 375/1

[56] References Cited

U.S. PATENT DOCUMENTS

| | | | |
|---|---|---|---|
| 5,103,459 | 4/1992 | Gilhousen et al. | 375/1 |
| 5,185,762 | 2/1993 | Schilling | 375/1 |
| 5,208,829 | 5/1993 | Soleimani et al. | 375/1 |
| 5,276,705 | 1/1994 | Higgins | 375/1 |

Primary Examiner—Salvatore Cangialosi
Attorney, Agent, or Firm—Gordon R. Lindeen, III; William J. Streeter; Wanda K. Denson-Low

[57] ABSTRACT

A direct-sequence multiple-access code division (DS-CDMA) communication system accommodates a multiplicity of separate transmitters (12) and at least one base-station receiver (14). Each transmitter generates a transmitted signal (16) at a common carrier frequency. Each transmitter has an assigned spreading code. Each bit time within the transmitted signal includes a unique signature waveform (21) generated from the spreading code that identifies the source of the transmitted signal. For a given transmitter, the transmitted signals from the other transmitters represent "multi-access noise" that may adversely degrade the signal-to-noise ratio (SNR) of that transmitter's signal at the receiver. Each transmitter operates using a spectrally inefficient power spectrum, i.e., a non-flat power spectrum, that simplifies the transmitter circuits. Each transmitter includes a clock source (26), a signature waveform generator (28), a data generator (30, 32), a first multiplier (42), a low pass filter (44), and RF generator (46), a second multiplier (48), a bandpass filter (50), a power amplifier (52) and a broadcast antenna (54). The receiver processes the received waveform signal on a bit-by-bit basis in the absence of knowledge of the other transmitters' spreading codes. An adaptive linear filter (66) included within the receiver (14) operates to make the SNR for the spectrally-inefficient transmitted signals approach asymptotically the SNR that would be received from a spectrally-efficient transmitted signal. Additionally, the receiver rejects narrowband interference, thereby providing superior performance over a spectrally-efficient system with no narrowband noise rejection.

19 Claims, 5 Drawing Sheets

MULTIPLE-ACCESS NOISE REJECTION FILTER FOR A DS-CDMA SYSTEM

BACKGROUND OF THE INVENTION

The present invention relates to multiple-access communication systems, and more particularly to a multiple-access communication system that utilizes a direct-sequence code-division multiple-access (DS-CDMA) approach, thereby allowing a multiplicity of separate transmitters to efficiently access a stationary base-station receiver.

Multiple-access communication systems are typically designed for use with a relatively large number of separate transmitters (e.g., portable or mobile transmitters) that interface with at least one stationary receiver at one or more designated receiving locations. Such multi-access systems are commonly used with digital cellular telephones, personal communication services, wireless local area networks (LAN's), and the like. Because the receiver(s) of such systems must allow access to a large number of users, each having a transmitter, some means must be used to efficiently interconnect the multiple transmitters to the receiver(s), i.e., to efficiently utilize the available channel spectrum. Common techniques used to allow such multiple access include frequency division multiple access (FDMA), time division multiple access (TDMA), and code-division multiple access (CDMA). The present invention provides multiple access through a CDMA-based communication system.

A simplified model of a CDMA system is as follows: a common carrier frequency, modulated with data having a known bit time, is transmitted to a common receiver from each of several transmitters. All of the transmitters share the same carrier frequency. Each transmitter has its own low bandwidth information bearing signal. This signal is multiplied by a unique high bandwidth signature waveform, which makes it possible for the receiver to distinguish the desired signal from the other signals transmitted from the other transmitters. For purposes of the present application, it is assumed that the signature waveform consists of a sum of time-offset copies of a waveform called the "chip waveform." The signature waveform may be visualized as the result of convolving the chip waveform with a train of impulses, each of unit area, and of positive or negative polarity. The sequence of polarities included within the train of impulses is known in the art as a "spreading sequence" (or "spreading code"). The spreading sequence is unique to each transmitter, but the chip waveform is the same. If, as is common in the art, the spreading sequences appear statistically like random binary sequences, then the power spectrum of the resulting signature sequence is substantially the same as that of the original chip waveform. Thus, each transmitter sends a waveform of similar power spectrum over the channel, and a receiver which has knowledge of a spreading sequence used by a transmitter can distinguish the signal sent by that transmitter on that basis. The unit of time between impulses in the impulse train described above is known as a "chip time", $T_C$, and the reciprocal of this time is known as the "chip rate". The present invention is not limited to the above model of DS-CDMA, but the description is simplified by such a model.

A common problem facing all multiple-access communication systems is accurately detecting the transmitted signal at the receiver after the signal has passed through a noisy channel, i.e., after the transmitted signal has been corrupted with noise. Such noise may include signals from other transmitters, thermal noise, and noise from other sources. A measure of the ability to accurately detect a signal in a noisy environment is the signal-to-noise ratio (SNR), defined as the ratio of the power of the desired signal divided by the power of all other undesired signals, measured at the final signal which is used to make a decision about the information bearing signal. A high SNR indicates that the integrity of the signal, when received at the receiver, has been more or less preserved, thereby enabling the individual bits of the signal to be detected above the noise with a low probability of error. It is thus a common objective of any communication system, including multiple-access communication systems, to achieve a high SNR, despite the noisy channels and mediums through which the transmitted signal may traverse as it propagates from the transmitter to the receiver.

In a DS-CDMA system, the transmitted signal is not only subject to additive white Gaussian noise (AWGN), a common form of noise in most communication channels, but is also subject to "multiple-access noise", i.e., noise resulting from the presence of other users who are transmitting at the prescribed carrier frequency and bit rates, but with different signature waveforms. To minimize the effect of the AWGN, it is known in the art to implement the receiver of a DS-CDMA system as a filter matched to the signature waveform of the user (transmitter) of interest. Unfortunately, such matched filter, while optimum for minimizing probability of bit error in AWGN, performs poorly when significant multiple-access noise is present. Thus, what is needed is a type of filter for use within a DS-CDMA receiver that performs acceptably in the presence of significant multiple-access interference.

An optimum multi-user receiver that minimizes multi-user noise is known. However, such optimum multi-user receiver is extremely complex. Numerous sub-optimal simplifications of such optimal structure have been proposed, however, such "simplifications" still require locking and despreading of some or all of the interfering signals, and hence also represent substantially complex circuitry. Thus, the matched filter receiver, despite its limitations, represents the most common method in practice.

Given a matched filter receiver structure, it is known that under certain broad conditions, the SNR in a CDMA system is maximized when all users transmit a signal with power evenly distributed over the entire allowed band. Thus, the power spectrum is a rectangular shape in the frequency domain, with extremely sharp dropoff at the edges of the allowed band (i.e., low "excess bandwidth"). Because this makes efficient use of the allowed band, such will hereafter be referred to as "spectrally efficient" signalling, or transmitting. Unfortunately, the time domain waveform corresponding to a rectangular block in the frequency domain is difficult to generate, especially at high chip rates. This results in a transmitter which is not only expensive to design and manufacture, but may be bulky to house and may consume more power than is desired. Because each user of such system employs a separate transmitter, the overall complexity and cost of the system thus increases dramatically.

It is evident, therefore, that what is needed is a practical, economical receiver structure that represents a simplification of prior art receiver systems. The present invention addresses the above and other needs.

SUMMARY OF THE INVENTION

A DS-CDMA communication system made in accordance with the invention includes a multiplicity of transmitters and at least one receiver. Each transmitter transmits its outgoing DS-CDMA signal using a spectrally inefficient power spectrum, i.e., a non-flat power spectrum, thereby simplifying the circuitry used within the transmitter, and allowing the transmitter to be less expensive and smaller than spectrally-efficient CDMA transmitters. The receiver receives the transmitted CDMA signal and operates thereon on a bit-by-bit basis, i.e., bit decisions are based on observation of the received waveform over approximately one bit time in the absence of knowledge of the other users' (transmitters') spreading codes, chip timing, and carrier phase.

The receiver includes a matched filter and an adaptive linear falter. The matched filter is designed to have a frequency response that matches the power spectrum of the transmitted CDMA signal, as is known in the art. The adaptive linear filter is configured to make the SNR for the spectrally-inefficient signature waveforms received from the transmitter approach asymptotically the SNR that would be received from a spectrally-efficient transmitted signal, at high signal to thermal noise ratios. Advantageously, because CDMA systems typically operate in a situation of high multiple-access noise and low thermal noise, this asymptotic result may be nearly realized in practice. Hence, the DS-CDMA system of the present invention advantageously simplifies the task of the transmitter (allowing transmission of spectrally-inefficient signature waveforms) while attaining a SNR performance nearly as good as spectrally-efficient spreading of the same bandwidth. Further, the use of the adaptive linear filter makes the system highly resistant to narrowband noise.

In accordance with one aspect of the invention, the adaptive linear filter utilized by the DS-CDMA receiver operates as an analog transversal filter on the incoming RF signal, before downconversion occurs to remove the RF carrier. Such filter advantageously allows the SNR to be nearly maximized when the number of CDMA users (i.e., the number of transmitters) is large (more than about 5 to 10). The adaptive filter includes a sequence of delay elements that delay the incoming signal by a prescribed amount. The delay may be realized, for example, using an analog delay line, in which case the delay provided is for a fixed time increment, selected to be an integer multiple of one cycle of the RF carrier signal. Tap points are provided after each delay, and the delayed signal from each tap, as well as the incoming signal, are multiplied by appropriate "tap weight" signals, or tap coefficients, and then summed. The tap coefficients are adaptively adjusted, using feedforward and feedback components of the incoming and delayed signals, so as to produce the set of tap coefficients that approximately maximize the average SNR.

In accordance with another aspect of the invention, after the signal has passed through the adaptive linear filter, the filtered signal is sampled to yield a signal series (e.g., at a rate defined by the chip rate) that enables the signature waveform included within the bit interval to be discerned. The signal series is then despread and summed to provide an output signal which is an appropriate decision statistic for the bit interval.

Thus, one embodiment of the invention may be characterized as a direct-sequence multiple-access code division (DS-CDMA) communication system. Such system includes a multiplicity of separate transmitters and at least one base-station receiver. Each of the mobile transmitters includes: (a) means for producing a unique binary spreading sequence; (b) means for generating from such binary spreading sequence a unique signature waveform, said unique signature waveform having a bandwidth substantially corresponding to an allowed channel bandwidth, and a non-flat power spectrum which rolls gradually at the band edges; (c) means for generating a low bandwidth analog baseband waveform signal encoded with digital data that is to be transmitted; (d) means for multiplying the unique signature waveform with the low bandwidth analog baseband waveform to yield a direct sequence spread waveform signal; (e) means for modulating a common RF carrier signal with the direct sequence spread waveform signal; and (f) means for transmitting the modulated RF carrier signal.

The base-station receiver of such communication system comprises: (a) an RF receiver that receives the transmitted modulated RF carrier signals from each of the multiplicity of transmitters, (b) a filter that filters the modulated RF carrier signal to maximize the SNR and to compensate for the non-flat power spectrum of the signature waveform, and (c) a spread spectrum receiver that processes the filtered modulated RF carrier signal to despread such signal in order to identify a particular signature waveform contained therein, downconvert such signal to remove the RF carrier therefrom, and integrate such signal over a bit time to determine the informational content thereof, i.e., whether such integrated signal represents a logical "1" or a "0". The filter includes a matched filter followed by an adaptive filter.

It is thus a feature of the present invention to provide a simplified DS-CDMA system that achieves a high SNR, despite the noisy channels and mediums through which the transmitted signal traverses as it propagates from the transmitter to the receiver.

It is another feature of the invention to provide such a DS-CDMA system that allows simplified transmitter circuits to be used by eliminating the need for flat-spectrum chip waveform pulses, and instead allows a transmitted chip waveform shape with a rounded spectrum.

It is a further feature of the invention to provide such a simplified DS-CDMA system that includes a receiver which compensates for a spectrally-inefficient shape of the transmitted pulse, which compensation provides a SNR that approximates that which could be obtained using a spectrally-efficient shape.

It is an additional feature of the invention to provide an adaptive filter for use within a DS-CDMA receiver that performs acceptably in the presence of significant multiple-access interference.

It is still a further feature of the invention to provide a practical and economical receiver structure that nearly maximizes the SNR, improves the probability of error, is highly resistant to narrowband noise, and makes bit decisions based on observation of the received waveform over one bit time in the absence of knowledge of the other users' (transmitters') spreading codes, chip timing, and carrier phase.

BRIEF DESCRIPTION OF THE DRAWINGS

The above and other aspects, features and advantages of the present invention will be more apparent from the following more particular description thereof, presented in conjunction with the following drawings wherein:

FIG. 10 shows a more detailed block diagram of the adaptive linear filter included within the model of FIG. 8.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
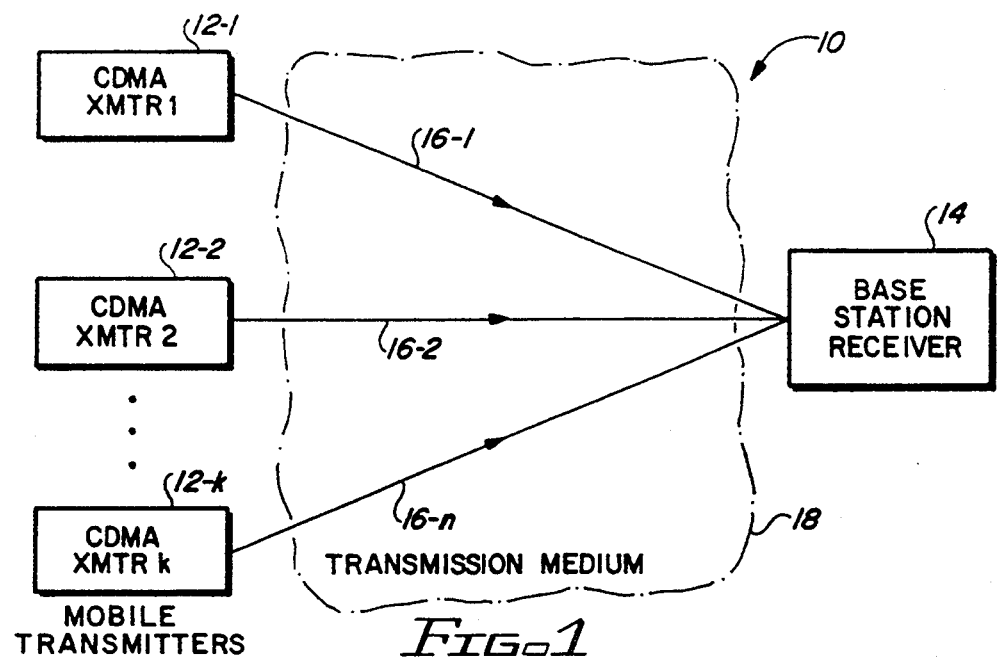
FIG. 1 illustrates the concept of mobile-to-base communications utilized by a DS-CDMA communication system.

Referring first to FIG. 1, there is shown a communications system 10 that includes a plurality of separate transmitter units 12-1, 12-2, . . . 12-k (any one of which may hereafter be referred to as the transmitter 12 or transmitter unit 12), and a single base-station receiver 14. For many applications, the transmitter units 12 are mobile, as in a digital cellular telephone system. Hence, hereafter the system 10 may be referred to as a mobile-to-base station communication system. However, it is to be understood such description is only exemplary and that the transmitter units 12 need not be mobile.

Each of the transmitter units 12 is configured to transmit a signal that is modulated in accordance with a code-division multiple access (CDMA) scheme, as explained more fully below. The transmitted CDMA signals propagate, along respective signal paths 16-1, 16-2, . . . 16-k (referred to generically hereafter as the signal path 16), through a transmission medium 18, and are received at the base-station receiver 14. The transmission medium 18 may also be referred to as the communication channel. Although a single signal path is shown from each transmitter 12 through the medium 18 to the base-station receiver 14, it is understood that multiple signal paths may exist, e.g., due to reflections of the transmitted signal. Thus, it is common for a given transmitted signal to arrive at the base-station 14 through different signal paths. Such multiple paths create channel distortion in the received signals. Applicant's copending application, A FRACTIONALLY-SPACED EQUALIZER FOR A DS-CDMA SYSTEM, filed concurrently herewith, and incorporated herein by reference, addresses a preferred manner for handling such channel distortion.

The medium (or channel) 18 introduces noise into the transmitted signals received at the base-station 14. Additionally, there may be narrowband interference from a nearby narrowband communications system, or from hostile jamming. A major source of interference in a CDMA system is noise from other users of the system, known in the art as multiple-access interference. An important feature of the receiver 14 of the present invention is to alleviate the effects of such multiple-access noise, and to be highly resistant to narrowband noise, as well as to increase the signal-to-noise ratio (SNR) so that the transmitted signals can be detected at the receiver 14 with a low probability of error.

All efficient communication systems, such as the mobile-to-base station system shown in FIG. 1, utilize some technique for maximizing the channel efficiency, i.e., for maximizing the number of users (i.e., transmitter units) that may communicate through the system 10 without interfering with each other. As indicated in the above background discussion, many different "multiple use" schemes are known in the art. Such multi-access schemes include, for example, frequency division multiple access (FDMA) wherein each user is assigned a different transmission frequency; time division multiple access (TDMA), wherein each user transmits a signal that occupies a different time slot or space; and code-division multiple access (CDMA), wherein each user transmits a signal at the same frequency and time, but wherein each information-bearing signal is further encoded with a unique signature waveform. The communication system 10 of the present invention utilizes a CDMA scheme, and is particularly suited for a CDMA scheme that operates at a high data rate, although the invention may be used with any CDMA scheme, e.g., a CDMA-based cellular telephone system.

Figure 2:
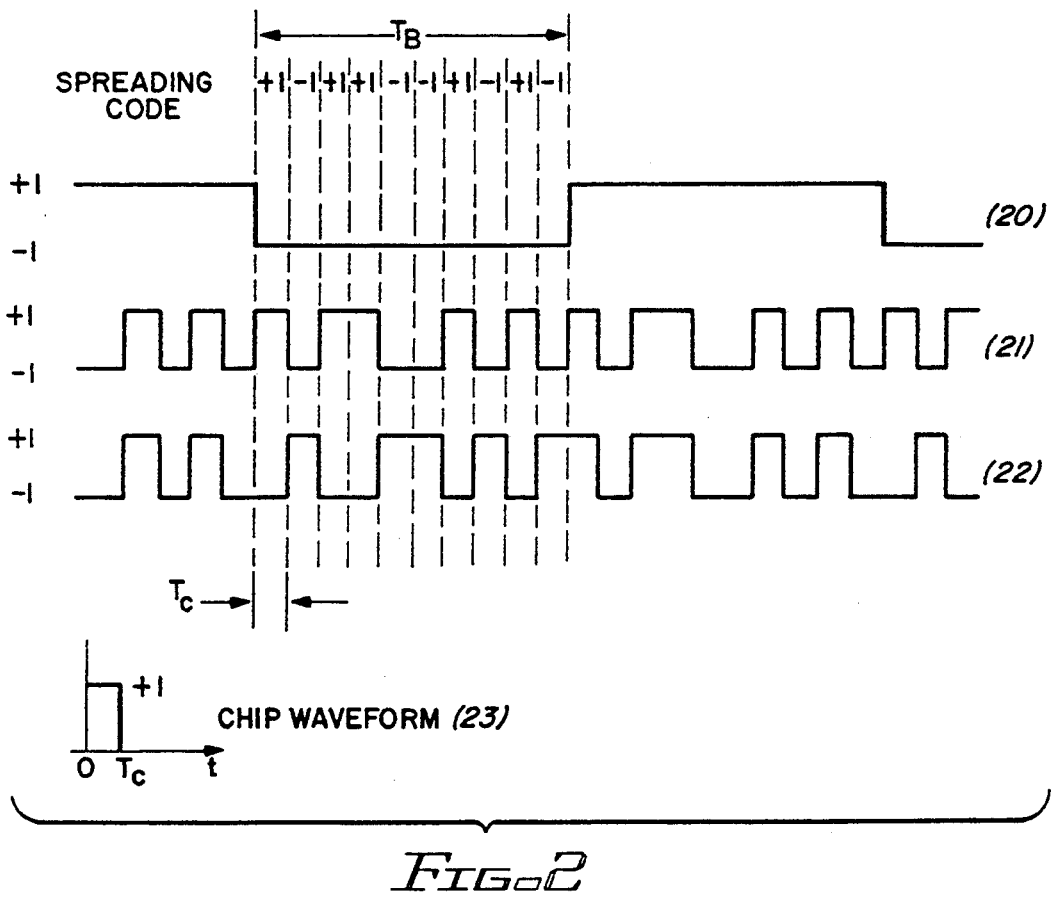
FIG. 2 functionally depicts the concept of code-division multiple access (CDMA); showing how a CDMA signal made up of a plurality of chips at a chip time $T_C$ is used within each bit time, $T_B$, of a data signal.

The basic concept of CDMA modulation is taught with respect to FIG. 2. Shown in the upper portion of FIG. 2 is a data waveform 20 that includes a plurality of bit times, $T_B$. For purposes of FIG. 2, the waveform 20 is shown as a function of time and amplitude, with time being the horizontal axis, and amplitude being the vertical axis. The waveform 20 thus includes a sequence of data bits, each of duration $T_B$, with each bit being either a digital "1" or a "0". A sequence of bits of a prescribed length (number of bits) is referred to as a digital "word". Typically, for most digital communication systems, a sequence of digital data words must be transmitted in a prescribed format in order to identify a particular user, and in order to provide other control and management information. For example, a cellular telephone system usually requires that each mobile transmitter transmit several informational words, each of a known or prescribed length, e.g., 48 bits. Even voice signals that are transmitted from the mobile transmitters to the base-station receiver once acquisition has been achieved and all the necessary control and management signals have been sent, may be converted to digital words prior to transmission. The waveform 20 thus comprises the low bandwidth information bearing signal. Only two complete bits of such information bearing signal are shown.

For clarity, the digital waveform 20 shown in FIG. 2 is depicted in an NRZ (non-return-to-zero) format (where a logical "1" maps to a −1 normalized amplitude, and a logical "0" maps to a +1 normalized amplitude). It is to be understood, however, that such representation is only exemplary. In practice, the information bearing signal 20 may be encoded in any appropriate manner, e.g., with Manchester (biphase) encoding, in order to shift the power spectral density of the transmitted waveform away from zero, or for other purposes.

In a CDMA scheme, each bit of the digital waveform 20 is further subdivided into a plurality of "chip times", $T_C$, as shown in the lower portion of FIG. 2. Typically, there is a large number of chip times within each bit. About 127 to 255 chips per bit is typical. The signature waveform consists of a square-wave binary waveform signal 21 which assumes the value of +1 or −1 in each chip-time interval $T_C$. The value assumed by the signature waveform during each interval $T_C$ is determined by the successive values of the binary spreading sequence (code) for a particular user. The signature waveform 21 is multiplied by the information bearing signal 20 to yield a direct sequence spread waveform 22.

For the example shown in FIG. 2, there are ten chips per bit. A chip waveform 23 comprises a rectangular (in time) pulse of duration $T_C$ and amplitude 1. The signature waveform signal 21 is obtained by repeating the chip waveform 23 at $T_C$ intervals, each occurrence being multiplied by successive elements of the spreading code {+1, −1, +1, +1, −1, −1, +1, −1, +1, −1}, with the spreading code being repeated each bit time $T_B$. The information bearing signal 20 is multiplied by the signature waveform 22 to yield the direct sequence spread waveform. Thus, when the data bit is a logical "1" (or a −1 amplitude as shown in FIG. 2), the direct sequence spread waveform 22 comprises the inverse of the signature waveform 21. When the data bit is a logical "0" (or a "+1" amplitude as shown in FIG. 2), the direct sequence spread waveform 22 is the same as the signature waveform 21.

Each mobile transmitter 12 (FIG. 1) is configured to uniquely encode each bit time with a particular signature waveform. Such signature waveform thereafter serves to uniquely identify the bit as having originated from a particular transmitter. Thus, when multiple transmitters are used, and multiple bits are thus in the transmission medium at any given time, each bit carries its own unique signature waveform, which unique signature waveform may be considered as an "identification tag" that identifies the particular transmitter from which the bit originated. The presence of such "identification tag" thereafter conceptually provides a means for sorting all the bits received at the base-station receiver 14 so that the receiver processing circuits can determine which received bit signals came from which transmitters, thereby enabling multiple users to use the system at the same time.

A significant advantage of a CDMA-based system is that the transmitter units may operate asynchronously. Asynchronous operation significantly reduces the complexity of the transmitter circuits as compared, e.g., with a TDMA-based system where careful synchronization between all of the transmitters is required. Moreover, in a CDMA-based system, the transmitter units 12 may all operate at the same carrier frequency. Hence, the individual transmitter units 12 need not be individually tuned to a specific operating frequency, and can share the same transmission bandwidth with other transmitter units. Such bandwidth sharing and avoidance of individual tuning significantly reduces the cost of manufacturing and maintaining the mobile transmitter units 12. The present invention retains this important advantage of a CDMA-based system.

Figure 3A:
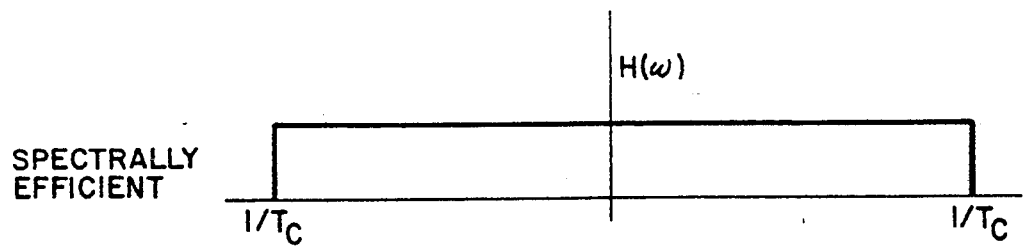
FIGS. 3A and 3B conceptually illustrate a spectrally efficient power spectrum and a spectrally inefficient power spectrum, respectively.

The present invention further simplifies the design, and hence the cost of manufacture and maintenance, of each transmitter unit 12 in that the transmitter unit 12 need not operate in a spectrally efficient manner. As explained previously, spectrally-efficient CDMA systems have heretofore transmitted their direct sequence spread waveform using a flat power spectrum in order to improve the SNR of the received signal, e.g., by using signature waveforms constructed as shown in FIG. 2, where the chip waveform is a sine shape, with a rectangular spectrum occupying the entire allowed band. To transmit flat-spectrum pulses requires the use of output circuitry within the transmitter unit, e.g., an output filter, that has a frequency response substantially as shown in FIG. 3A. Disadvantageously, such output circuitry, if optimum, is very complex and expensive.

Perhaps the chief disadvantage of the flat-spectrum chip waveform is its duration in the time domain. It can be shown that the inverse Fourier transform $h(t)$ of a frequency response $H(\omega)$ as shown in FIG. 3A only decays as $1/t$. Thus, each pulse is significantly different from 0 over a large number of chip intervals $T_C$ in both directions from the center. This complicates the production of an accurate approximation of $h(t)$. For example, for low bandwidth spread systems, a reasonable method of producing $h(t)$ is to use a digital finite impulse response (FIR) filter with an impulse response shaped like $h(t)$ but sampled at fractions of $T_C$. The result, when passed through a suitable digital-to-analog (D/A) converter looks like $h(t)$ with stair-step edges, which stair-step edges may then be filtered off. However, the duration of the digital FIR filter must be large to generate an accurate representation of $h(t)$ because of the pulse's long duration in the time domain. Thus, long duration in the time domain of the chip pulse is a significant disadvantage, and use of the digital FIR filter is limited to low chip rates.

Figure 3B:
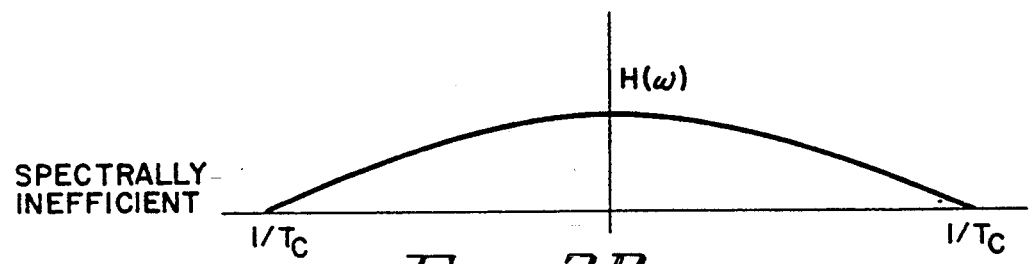

In contrast to the spectrally efficient transmission of flat-spectrum chip waveforms in prior CDMA transmitter units, the present invention utilizes a spectrally inefficient transmission, having a rounded shape as shown generally in FIG. 3B. Such spectrally inefficient transmission may be realized, e.g., by using a digital circuit to generate square-wave chips, (where a "chip" is defined here to be the spreading-code modulated chip waveform, with $T_C$ as the chip time), and then passing the chips through an analog low-pass filter with cutoff at the first spectral null of the square-wave. Such a transmitter is extremely simple and can operate at chip rates in excess of 100 MHz. Further, due to its simplicity, such a transmitter is significantly less expensive.

Figure 4:
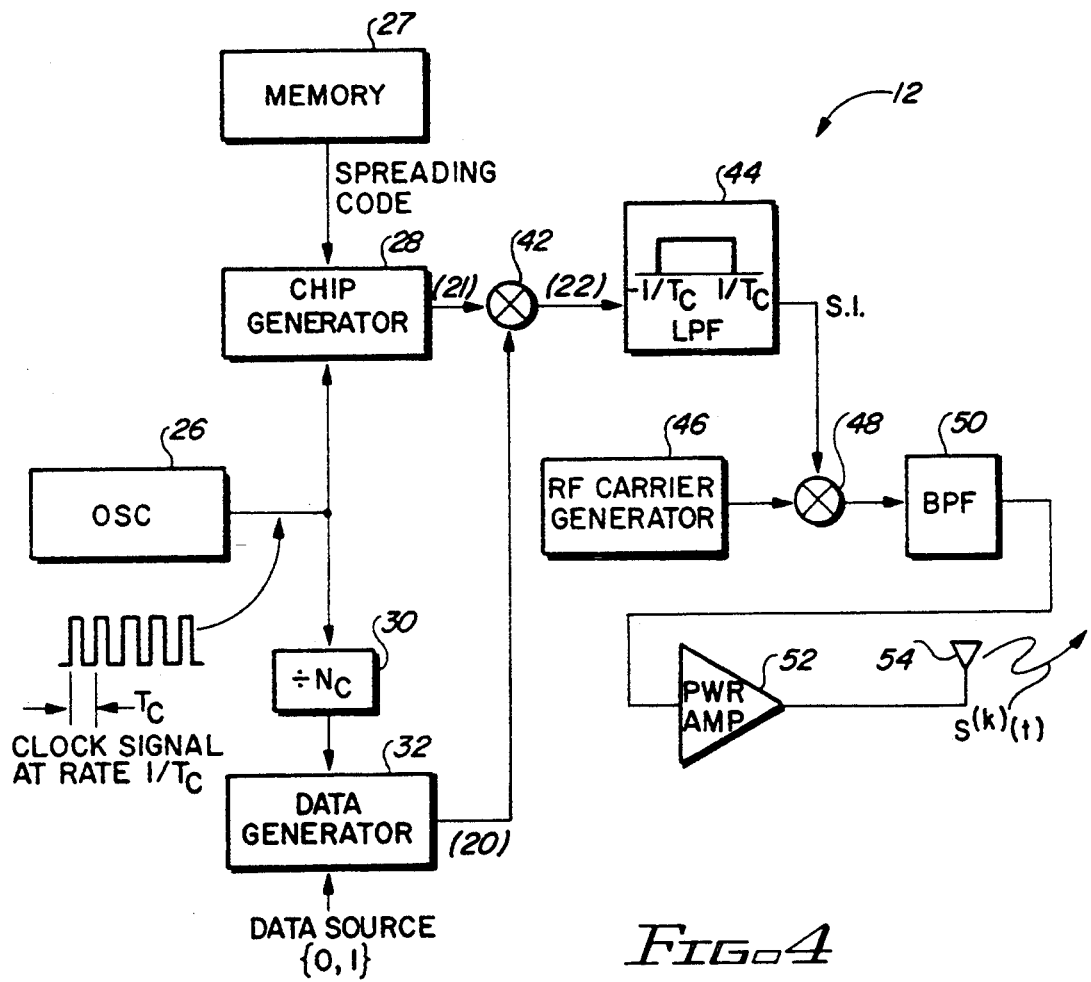
FIG. 4 is a simplified functional block diagram of a CDMA transmitter made in accordance with the invention.

A simplified functional block diagram of a CDMA transmitter unit 12 that transmits in a spectrally inefficient manner in accordance the present invention is shown in FIG. 4. It is to be emphasized that such diagram is functional in nature, and that the individual blocks included in such block diagram may, in practice, be realized in numerous ways and forms, including dedicated hardware circuits, adaptive hardware circuits controlled by firmware, processor circuits controlled by a suitable control program (software control), or combinations of such hardware, firmware and software.

As seen in FIG. 4, the transmitter unit 12 need only include an oscillator 26 that generates a basic clock signal at a rate $1/T_C$ from which the bit time $T_B$ can be derived. Typically, the oscillator 26 operates at the chip time, so that the period of the oscillator is the chip period, $T_C$. The clock signal generated by the oscillator 26 thus drives a chip generator 28, with the chip generator 28 being configured to generate a chip waveform signal 22 that is unique to the transmitter 12. A memory 27 (which may be included as part of the chip generator 28, but is shown separately in FIG. 4 for clarity), or equivalent circuitry, contains the spreading code from which the signature waveform signal 21 is derived. The clock signal generated by the oscillator 26 is also divided by an integer $N_C$ by a dividing circuit 30, where $N_C$ represents the number of chips per bit. The resultant signal, after division by $N_C$, is then used to drive a data generator 32. The data generator 32 is modulated with a suitable data source in order to generate an information bearing signal 20.

The signature waveform signal 21 output from the chip generator 28 is then multiplied by the information bearing signal 20 output from the data generator 32 using a suitable multiplier circuit 42, or equivalent modulator. Where the signature waveform signal 21 and the information bearing signal are digital logic signals that assume values of "1" or "0" to represent the binary signal, a simple modulator may be realized using an Exclusive OR gate. Where the signature waveform signal 21 and the information bearing signal are signals that assume values of "+1" and "−1" to represent binary data, as shown in FIG. 2, then a simple modulator is a multiplying circuit.

Once the signature waveform signal 22 has been incorporated into the information bearing signal 33 through the modulation circuitry 42, the resulting combined signal is passed through a suitable low pass filter (LPF) 44 having a cutoff frequency at the first spectral null of the chip waveform. The output of this LPF has a rounded power spectrum in the band $\pm 1/T_C$, shaped as the main lobe of a sinc-squared function, and is thus spectrally-inefficient (S.I.) as discussed above. Such S.I. signal, which is now an analog signal, modulates an RF carrier signal, generated by an RF generator 46, in conventional manner using a conventional RF modulator circuit 48. Typically, some form of digital modulation may be used, such as DSB-AM (double side band amplitude modulation), which may be realized in its simplest form by multiplying the sequence by the RF carrier. Other types of modulation may also be used. The resulting signal is passed through a band-pass filter (BPF) 50, to remove unwanted side-bands, amplified in a power amplifier 52, and then transmitted through a suitable broadcast antenna 54. The transmitted signal, $s^{(k)}(t)$, is thus an RF signal modulated with the information bearing signal 20, each bit of which is further modulated with the chip waveform signal 21.

Figure 5:
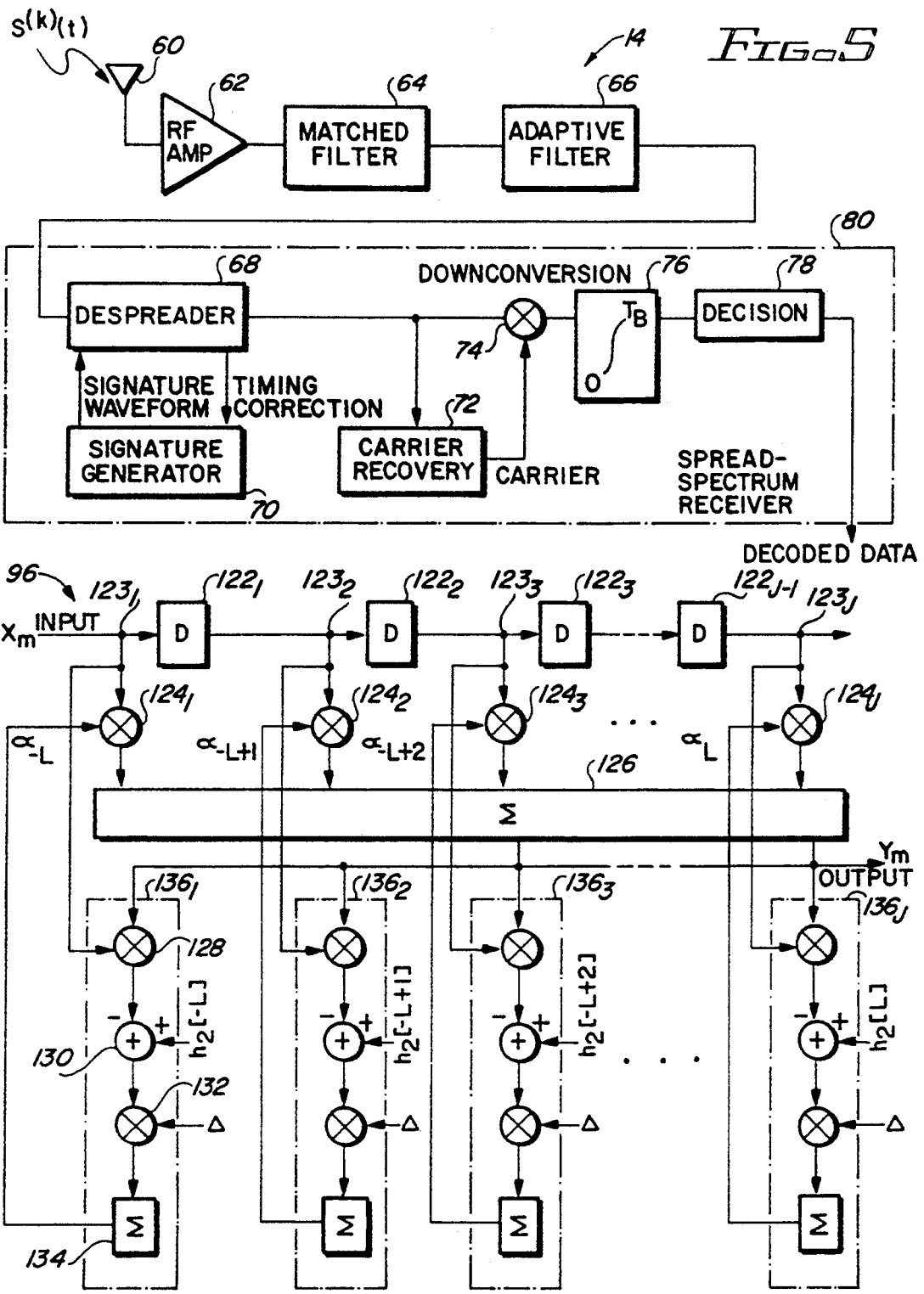
FIG. 5 is a simplified functional block diagram of a CDMA receiver made in accordance with the invention.

Referring next to FIG. 5, a simplified functional block diagram of the base-station receiver 14 is depicted. The base-station receiver 14 includes a suitable receiving antenna 60 through which the transmitted signal $S^{(k)}(t)$ is received. Such received signal is first amplified and filtered using an RF amplifier 62. Next, the amplified RF signal is applied to a matched filter 64.

The matched filter circuit 64 is designed to match the frequency response of the incoming spectrally inefficient chip waveform included in each bit of the information bearing signal 20 included within the incoming signal $s^{(k)}(t)$. Thus, the frequency response of the matched filter 64 has a general rounded shape, as shown in FIG. 3B. The design of the matched filter 64 may be conventional.

The filtered signal is next applied to an adaptive linear filter 66 which, for the embodiment shown in FIG. 5, is effectively an analog traversal filter operating in a radio frequency (RF) band. Other embodiments of the invention may utilize a sampled digital filter to perform the adaptive filtering function. The adaptive linear filter 66, which comprises a key element of the present invention, compensates for the spectrally inefficient signature waveform. The net result is that SNR of the received signal, after being processed by the adaptive linear filter 66, approaches asymptotically the SNR that would be received from a spectrally-efficient transmitted signature waveform signal, assuming a high signal to thermal noise ratio (which is usually the case for a CDMA system).

Figure 6:
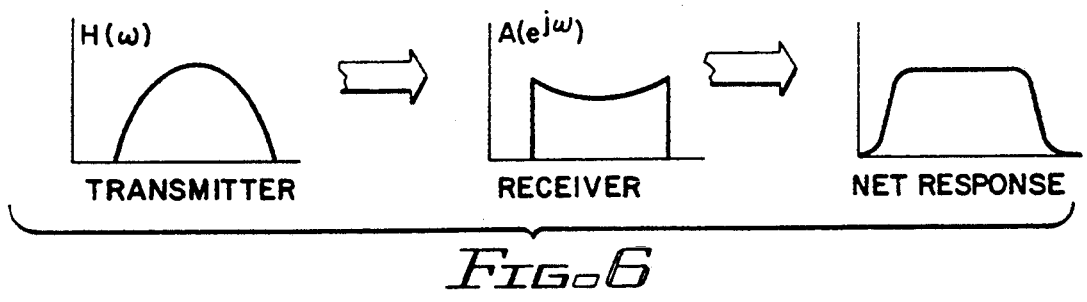
FIG. 6 conceptually illustrates the result achieved by the invention relative to the frequency domain performance of a communication system made in accordance with the present invention, and in particular illustrates how an adaptive filter, having a transfer function identified as $A(e^{j\omega})$, used within the receiver compensates for the spectrally inefficient performance of the transmitter.

Conceptually, the above advantage of having the SNR approach the SNR that would be received from a spectrally-efficient signature waveform signal is achieved by making the frequency-domain response of the adaptive linear filter, referred to herein as $A(e^{j\omega})$, assume a "U" shape, as shown in FIG. 6. The net result of having such a U-shape frequency-domain response, as also shown in FIG. 6, is that it compensates for the spectrally-inefficient response of the transmitted signal, thereby rendering the power spectrum of the signal output from the adaptive filter substantially flat. A substantially flat response, in turn, maximizes the SNR, as is known in the art.

After passing through the adaptive linear filter 66, which filter 66 is described more thoroughly below in connection with FIG. 9, the signal is applied to a spread-spectrum receiver 80. Spread-spectrum receivers are known in the art. A first element of the spread-spectrum receiver is a despreader circuit 68. The despreader circuit 68 is coupled to a signature generator 70, adapted to match the chip generator 28 used in the transmitter 12 of a user of interest. The signal generator 70 applies the known signature waveform to the despreader circuit 68 and receives timing correction signals therefrom. The net result is that the despreader circuit identifies where within the signal the bit times start and stop. A carrier recovery circuit 72 then generates a suitable carrier signal that is applied to the despread signal in a suitable down conversion circuit 74 in order to remove the carrier frequency. The resulting downconverted signal is then integrated (summed) over the bit time $T_B$ by a suitable integrator circuit 76, and the resultant integrated signal is applied to an appropriate decision circuit 78. The decision circuit 78 determines whether the integrated bit is a digital "1" or "0". The data bits over time are accumulated, decoded, and used for their intended purpose—to convey information (control information, voice information, etc.) to a user of the receiver.

It is noted that the simplicity of the transmitter 12 achieved by the present invention comes at the cost of somewhat increased complexity within the receiver 14, such increased complexity being manifest by the inclusion of the adaptive linear filter 66. Advantageously, the "front end" of the receiver 14 shown in FIG. 5 may be a common front end used by all the incoming signals from the numerous transmitters. Such front end includes the antenna 60, RF amplifier 62, matched filter 64, and adaptive filter 66. Separate spread spectrum receivers (the "back end" of the receiver 14) would then be used for each transmitter of interest. In this way, multiple signals generated from multiple transmitters may be processed at the same time. Advantageously, because there are generally many more transmitters 12 than receivers 14, reducing the complexity of the transmitter (by allowing spectrally inefficient transmission) at the cost of additional complexity in the receiver (by addition of the adaptive filter) reduces the overall total system complexity and cost.

Note, the number of separate spread spectrum receivers need only be as great as the maximum number of transmitters which can be active simultaneously.

It is also noted that the receiver circuits (FIG. 5) may be realized in many forms. For example, each of the circuits included within the receiver 14 may be constructed from dedicated hardware circuits, comprising integrated circuits, transistors, resistors, capacitors, inductors, and other electronic components. Alternatively, the functions performed by some of the circuits can readily be carried out using a suitable processor circuit, e.g., a microprocessor circuit, controlled by a suitable control program. Moreover, for some applications, some functions included within the receiver circuits may be carried out using dedicated hardware circuits, and others may be carried out using an appropriately programmed processor circuit. It is submitted that those of skill in the art, given the description presented herein of the functions performed by such circuits and the inter-relationship between such circuits, can readily fashion such circuitry, whether realized using dedicated hardware circuits, programmed logic circuits, programmed processor circuits or combinations thereof.

Figure 7:
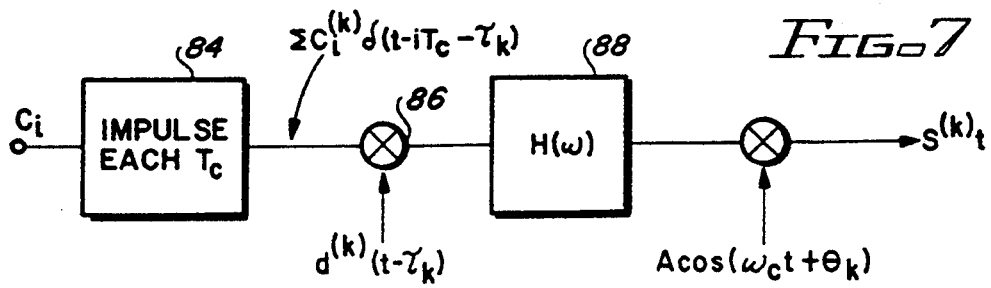
FIG. 7 depicts a model of the CDMA transmitter of the present invention.
Figure 8:
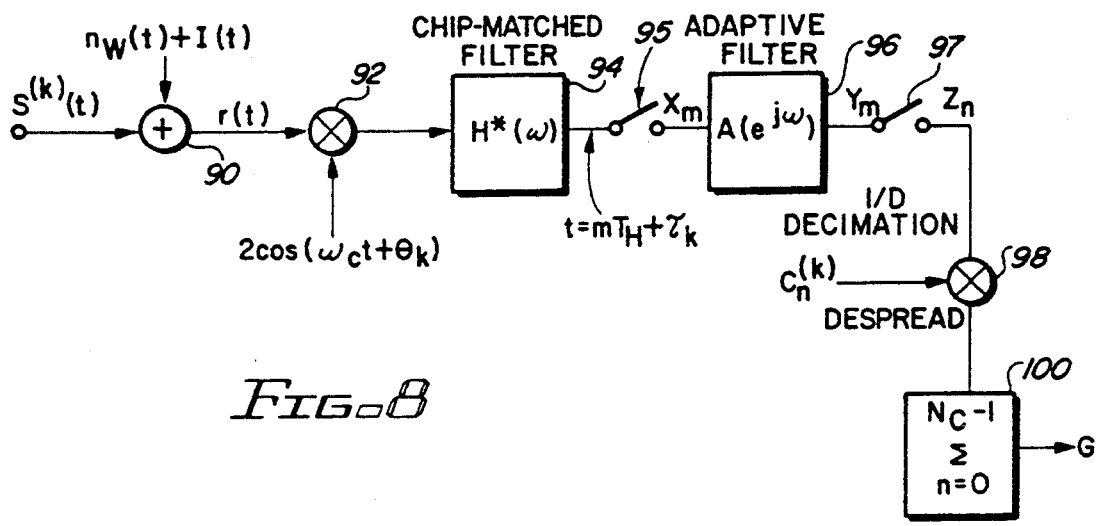
FIG. 8 illustrates a model of the CDMA receiver of the present invention.

Before describing the adaptive filter 66 in more detail, and in order to better understand the present invention, reference is next made to FIGS. 7 and 8 where there is shown a model of a transmitter and receiver, respectively, of the type that are used with the present invention. FIG. 7 depicts the model of the kth transmitter 12, assuming there are k CDMA users accessing the particular channel of interest. FIG. 8 depicts the model of the kth receiver. Although coherent downconversion cannot take place before despreading in practice, as modeled in FIG. 8, the operations are shown in the order indicated in FIG. 8 for mathematical simplicity. It is known in the art how the model of FIG. 8 may be converted to practice.

The kth users' data bits, $d_i^{(k)}$ belonging to the set $\{+1, -1\}$ are defined such that $$d^{(k)}(t) = \sum_{i=-\infty}^{\infty} d_i^{(k)} p_{T_B}(t - iT_B), \quad (0)$$

where $p_T(t)=1$ for t between 0 and T, and 0 elsewhere. The impulse generator 84 generates a train of impulses of unit area, with the polarity of each impulse determined by successive elements of the spreading code $c_i^{(k)}$. These impulses are generated at the rate $1/T_C$, where the number of chips per bit, $N_C(=T_B/T_C)$, is an integer. A sequence $b_i^{(k)}$ which belongs to the set $\{+1, -1\}$, is defined as the spreading code times the data, $d^{(k)}(t-\tau_k)$, such that $$b_i^{(k)} = c_i^{(k)} d_{\lfloor i/N_C \rfloor}^{(k)}, \quad (1)$$

where the term x within the brackets $\lfloor x \rfloor$ indicates the integer portion of x. Using this definition, it can be seen that the output of the multiplier 86 is another impulse train, given by $\Sigma c_i^{(k)} \delta(t-iT_C-\tau_k)$. This signal passes through a filter 88 having a transfer function $H(\omega)$. The filter $H(\omega)$ determines the chip waveform. Thus, for example, the system of FIG. 5 corresponds to the case where $H(\omega)$ is the Fourier transform of the chip waveform $p_{T_C}(t)$, illustrated as waveform 23 in FIG. 2. After passing through the filter 88, the resulting signal is multiplied by an amplitude constant A, and modulated with an RF carrier frequency $\omega_C$, such that the $k^{th}$ transmitted signal, $s^{(k)}(t)$, is given by $$s^{(k)}(t) = A\cos(\omega_c t + \theta_k) \sum_{i=-\infty}^{\infty} b_i^{(k)} h(t - iT_c - \tau_k), \quad (2)$$

where h(t) is the inverse Fourier transform of $H(\omega)$. It is assumed that the transmission system is band limited by the constraint $$H(\omega) = 0, \text{ for } |\omega| > \frac{\pi}{T_H} \quad (3)$$

for some constant $T_H$. Note that $T_H$ is distinct from the time between the starts of successive chip waveforms, $T_C$. It is assumed that $T_C = DT_H$ for some integer D. The integer D is thus the number of time periods $T_H$ per chip time $T_C$. The terms $\tau_k$ and $\theta_k$ are random variables that represent delays and phases that are independent and uniformly distributed in the region $[0,T_C]$ and $[0,2\pi]$, respectively.

Turning next to FIG. 8, a model of the $k^{th}$ receiver is shown. The transmitted signal $s^{(k)}(t)$ has the AWGN and the interference l(t) from the other channels added thereto, as represented by the summing block 90. The resultant signal, r(t), received at the receiver 14 during the interval $[0,T_B]$, assuming the constant A is perceived at time receiver to be at the same level from each of the K transmitters, has the form $$r(t) = s^{(1)}(t) + I(t) = n_\omega(t), \quad (4)$$

where $n_w(t)$ is the additive white Gaussian noise (AWGN) of two-sided spectral density $\eta_0/2$, $s^{(1)}(t)$ is time desired signal term, and l(t) is the interference due to the K−1 additional users of the channel. Such interference may be expressed as $$I(t) = \sum_{k=-2}^{K} s^{(k)}(t) \quad (5)$$

where it has been assumed, without loss of generality, that user 1 is the signal of interest.

For purposes of the model given in FIG. 8, the signal is then downconverted, as represented by the multiplier 92 and the signal $2\cos(\omega_C t + \theta_k)$, and passed through a chip matched filter 94. The chip matched filter 94 has a frequency-domain response of $H^*(\omega)$, designed to match the response $H(\omega)$ of the transmitter. The output of the chip matched filter is then sampled with a suitable sampler 95, at the Nyquist rate ($t = mT_H + \tau_k$), in order to yield a series $x_m$.

The series $x_m$ is applied to an adaptive linear filter 96. The adaptive linear filter 96 is a two-sided finite impulse response (FIR) filter having L taps per side. Such filter has tap coefficients $\{a_{-L}, \ldots a_L\}$ such that its discrete-time transfer function that may be expressed as $$A(e^{j\omega}) = \sum_{n=-L}^{L} a_n e^{-j\omega n}, \quad (6)$$

where $a_n$ are the tap coefficients.

The output $y_m$ of the filter 96 is decimated by a decimator 97 by a factor 1/D to yield a series $Z_n$ (at a rate $1/T_C$). Such series in then despread, by multiplying it by the known chip sequence $C_n^{(k)}$ using the multiplier circuit 98. Assuming that the signal $c_n^{(k)}$ is properly aligned with the signal of interest, it will correlate with high magnitude (with polarity determined by the information bearing signal) with the signal from the $k^{th}$ transmitter, and correlate with small magnitude with the signals from the other K−1 transmitters, thereby facilitating detection of the signal of interest. Once despread, the signal is summed over the bit time using an appropriate summation circuit 100 to yield a final bit signal G[p], which signal may be used as a decision statistic to determine whether the $p^{th}$ transmitted bit was a "0" or a "1".

Next, a more detailed description of the adaptive filter is presented. Two embodiments are presented. First, with reference to FIG. 9, a description of a continuous-input adaptive filter 66 will be given. As indicated above, and as shown in FIG. 5, such filter 66 occurs at a location in the receiver signal path that is upstream from the despreader 68. Thus, the filter 66 operates on an incoming signal 101 (which is the signal output by the matched filter 64) in continuous time within an appropriate RF band. Second, with reference to FIG. 10, a description of a discrete time adaptive filter 96 will be given. Such discrete time adaptive filter, which operates in the receiver model of FIG. 8, admits a more rigorous mathematical description, which illuminates the function of the continuous time filter of FIG. 9.

Figure 9:
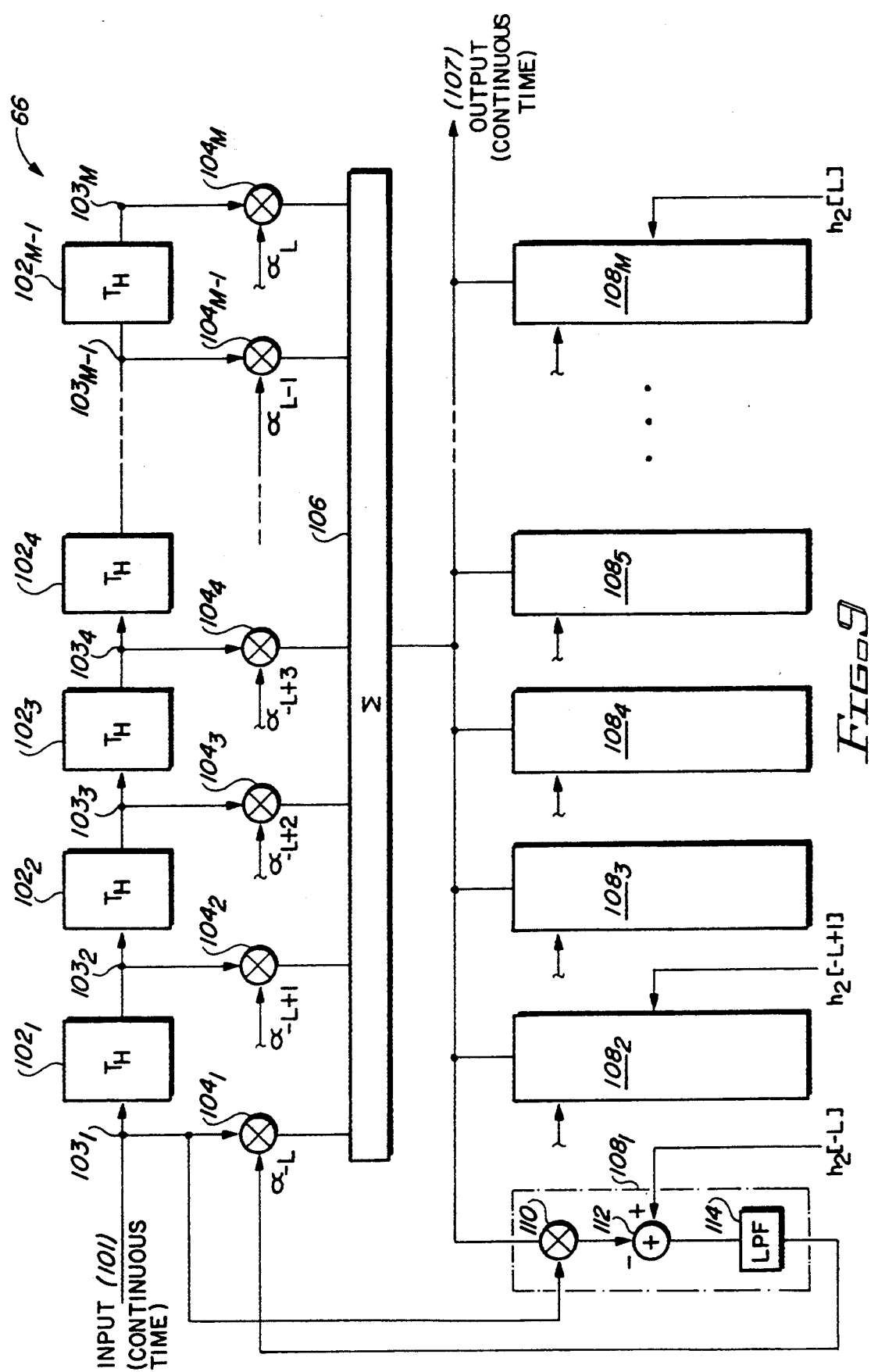
FIG. 9 shows a more detailed functional block diagram of the continuous-input adaptive filter used within the receiver of FIG. 5.

Turning then to FIG. 9, a block diagram of the continuous-input adaptive filter 66 is shown. It is the function of the filter 66 to provide the transfer function analogous to that expressed in EQ. (6) for the receiver model of FIG. 8. The adaptive filter 66 includes a series of M−1 delay elements, $102_1, 102_2, 102_3, \ldots 102_{M-1}$, each providing a delay of $T_H$. Because the incoming signal for the embodiment shown in FIG. 9 is an RF signal that is modulated, e.g., at carrier frequency $\omega_C$, $T_H$ should be some multiple integer of $\frac{1}{2}\pi\omega_C$. Such a delay assures that the tap signals, i.e., the signals derived from each delay element, add coherently. Each delay element has an input signal line and an output signal line. The signal on the output signal line is delayed by $T_H$ seconds from the signal appearing at the input signal line. The delay elements $102_j$ may be realized using any suitable delay element, such as an analog delay line.

Associated with the M−1 delay elements $102_j$ are M tap points $103_1, 103_2, 103_3, \ldots 103_M$, with one tap point being located on each side of each delay element $102_j$. Each tap point is coupled to one input of a respective multiplier element $104_1, 104_2, 104_3, \ldots 104_M$. The other input to the multiplier elements $104_j$ is a "tap weight" signal $a_n$, representing the tap coefficients of the filter 66. The tap coefficients are typically referred to as a series $a_{-L}, a_{-L+1}, \ldots, a_{L-1}, a_L$, where L is the number of taps per side of the filter (i.e., M=2L+1). The M outputs from the M multiplier elements $104_j$ are summed in a summation circuit 106. The output signal of the summation circuit 106 comprises an output signal 107 which, like the input signal, occurs in continuous time. The output signal 107 is directed to the despreader circuit 68, as shown in FIG. 5.

The output signal 107 is also applied to each of a series of M parallel signal processing paths $108_1, 108_2, 108_3, \ldots, 108_M$. Each signal processing path $108_j$ includes, as shown relative to signal processing path $108_1$, a multiplier element 110, a summation element 112, and a low pass filter 114. One input to the multiplier element 110 of each signal processing path comprises the output signal 107 from the summation circuit 106. The other input to each multiplier element 110 is the same signal that is applied to the input of the respective delay element 102. The output signal from the multiplier element 110 is applied as a negative input to the summation element 112. A positive input to the summation element comprises a reference signal $h_2[i]$. The signal $h_2[i]$ is derived from a signal $h_2(t)$ which is the inverse Fourier transform of $|H(\omega)|^2$. More particularly, $h_2[i]$ is defined as $h_2(iT_H)$. Because the summation element adds the negative output from the multiplier element 110 with the positive signal $h_2[i]$, it may also be considered as a comparison circuit, or "comparator" 110, that compares the output from the multiplier with the respective signal $h_2[i]$, and determines the difference therebetween. That is, by summing a first signal and a second signal, with the first signal having its polarity reversed (so that it is subtracted from the second signal), the summation element 112 effectively finds the difference between its two input signals.

The sum of the signals combined in the summation element 112 of each signal processing path 108 is applied as an input to the low pass filter (LPF) 114. The LPF 114 effectively functions as a continuous analog integrator circuit. The output of the LPF 114 comprises the tap weight signal $a_n$ referred to previously that is connected to the respective multiplier element 104 at the tap point of each delay element 102.

Although the adaptive filter 66 operates in continuous time as an analog transversal filter, its operation may be conceptually understood by a comparison with the discrete time adaptive filter 96 described below in conjunction with FIG. 10. That is, the signal values present in the continuous time filter 66 at any given instant of time are simply a function of the signal values already present immediately prior to such "instant of time." Such already present signal values may be thought of as preexisting signal conditions. As the time period between the current signal values and the preexisting signal conditions lengthens, the continuous time analog transversal filter 66 thus approaches the discrete time filter 96. Hence, to better understand the operation of the filter 66, it is helpful to next consider the discrete time filter 96 shown in FIG. 10.

Hence, turning to FIG. 10, it is noted that the discrete time filter 96 provides a discrete time transfer function as expressed in Eq. (6). As seen in FIG. 10, the discrete time adaptive filter 96 includes a series of J−1 delay elements, $122_1, 122_2, 122_3, \ldots 122_{M_{J-1}}$, each providing a delay of one sample. Each delay element has an input signal line and an output signal line. The signal on the output signal line is delayed by one sample from the signal appearing at the input signal line. Hereafter, the sampling rate which yields the input series $x_m$ is denoted by $1/T_H$ in order to be directly comparable with FIG. 9.

It is further noted that the update time of the discrete time filter 96, while typically set to the chip time $T_C$, need not be $T_C$. Updating can be done at any time interval, even in continuous time.

Associated with the J—1 delay elements 122$_j$ are J tap points 123$_1$, 123$_2$, 123$_3$, ... 123$_j$, with one tap point being located on each side of each delay element 122$_j$. Each tap point is coupled to one input of a respective multiplier element 124$_1$, 124$_2$, 124$_3$, ... 124$_j$. The other input to the multiplier elements 124$_j$ is a "tap weight" signal $\alpha_n$, representing the tap coefficients of the filter 96. The tap coefficients are typically referred to as a series $\alpha_{-L}$, $\alpha_{-L+1}$, ..., $\alpha_{L-1}$, $\alpha_L$, where L is the number taps per side of the filter (i.e., J=2L+1). The J outputs from the J multiplier elements 104$_j$ are summed in a summation circuit 126. The output signal of the summation circuit 126 comprises an output series signal $y_m$ which occurs at a rate of $1/T_H$. The output series signal $y_m$ is also directed to a suitable decimator circuit and than a despreader circuit, as shown in FIG. 8.

The output series signal $y_m$ is also applied to each of a series of J parallel signal processing paths 136$_1$, 136$_2$, 136$_3$, ..., 136$_J$. Each signal processing path 136$_j$ includes, as shown relative to signal processing path 136$_1$, a first multiplier element 128, a summation element 130, a second multiplier element 132, and an accumulator 134. One input to the first multiplier element 128 of each signal processing path comprises the output series signal $y_m$ from the summation circuit 126. The other input to each of the first multiplier elements 128 is the signal from the corresponding tap point 123$_j$. The output signal from the first multiplier element 128 is applied as a negative input to the summation element 130. A positive input to the summation element comprises a reference signal $h_2[i]$.

The sum of the signals combined in the summation element 130 of each signal processing path 136$_j$ is applied as an input to the second multiplier element 132. The other input to the second multiplier element 132 is a constant signal $\Delta$. The output of the second multiplier element 132 is summed (accumulated) in a summing element 134. The output of each summing element 134 comprises a respective one of the tap weight coefficient signals $\alpha_n$ of the adaptive filter. Such tap weight coefficient signal is connected to the respective multiplier element 104 at the tap point of each delay element 102.

In operation, i.e., at each discrete time, a tap coefficient vector $\alpha$ may be defined as $|\alpha_{-L}, \ldots, \alpha_L,|^T$. At time $iT_H$, i.e., each sample time, the contents of the delay line (sequence of delay elements 122) comprise a vector $x[i] = |x_{i+L}, \ldots, x_{i-L}|^T$. Similarly, a vector $h_2[0]$ may be defined as $|h_2[-L], \ldots, h_2[L]|^T$. Hence, if $\alpha^n$ represents the tap coefficients at the $n^{th}$ iteration, the adaptive filter shown in FIG. 10 implements the adaptive algorithm $$\alpha^{n+1} = \alpha^n + \Delta\{h_2[0] - x[n](x^T[n]\alpha^n)\} \quad (7)$$

In Eq. (7), $\Delta$ is a fixed constant chosen to give a desired rate of convergence to the algorithm. For suitable $\Delta$, Eq. (7) converges to $$R_x\alpha = h_2[0], \quad (8)$$

where $$R_x = E\{X[0]X^T[0]\} \quad (9)$$

is the covariance matrix of the input.

Advantageously, the tap weights defined by Eq. (8) approximately maximize an average expression for the SNR when the number K of CDMA users is large, e.g., more than about 5 to 10. Thus, by adaptively adjusting the tap weight signals $\alpha_i$ until a desired convergence of Eq. (8) is noted, the filter 66 effectively compensates for the non-flat spectrum input signal, and maximizes the SNR.

It is also to be noted that the set of tap weight signals that maximize the SNR is provided by an equation similar to Eq. (8) above, but where the matrix $R_x$ on the left side contains only the noise terms, not the signal of interest. A key feature of the invention is the recognition that if significant multiple-access interference is guaranteed to be present, i.e., if it is known that there will be more than 5 to 10 other users, then the solution to Eq. (8) is sufficiently close to the SNR-maximizing solution, regardless of the thermal noise level.

Turning back momentarily to the continuous time adaptive filter 66 shown in FIG. 9, it is seen that the same basic results are achieved in continuous time operation as are achieved in discrete time operation. That is, an adaptive function analogous to the one expressed in Eq. (7) is made to converge within an appropriate time through proper selection of a time constant associated with the LPF 114 of each signal processing path 108$_i$. Such selection may be made experimentally. Once convergence is obtained, the average expression for the SNR is approximately maximized when the number K of CDMA users is large, e.g., 5 to 10 or more, thereby compensating for the non-flat power spectrum of the transmitted signature waveform signal.

Further details associated with the background, design, and operation of the adaptive linear filter 66 made in accordance with the present invention may be found in Davis et al., "Implementation of a CDMA Receiver with Multiple-Access Noise Rejection", *IEEE Conference on Personal, Indoor, and Mobile Radio Communications* (pub. Oct. 19, 1992), incorporated herein by reference; Monk et al., "A Noise Whitening Approach to Multiple-Access Noise Rejection - Part I: Theory and Background and Davis et al., "A Noise Whitening Approach to Multiple-Access Noise Rejection - Part II: Implementation Issues".

While the invention herein disclosed has been described by means of specific embodiments and applications thereof, numerous modifications and variations could be made thereto by those skilled in the art without departing from the scope of the invention set forth in the claims.

What is claimed is:

1. A direct-sequence multiple-access code division (DS-CDMA) communication system comprising:
   (1) a multiplicity of transmitters, each including:
      (a) a first signal generator that generates an analog baseband waveform signal having a plurality of bits, each bit having a time period of $T_B$, said bits being digitally encoded with data that is to be transmitted,
      (b) a second signal generator that generates a unique signature waveform signal having a spectrally inefficient power spectrum, said unique signature waveform signal being made up of a sequence of chip waveform signals, each chip waveform signal in said sequence of chip waveform signals having a duration of $T_C$ seconds, a polarity controlled by a unique spreading code, and a bandwidth substantially corresponding to an allowed channel bandwidth, said spectrally inefficient power spectrum being spectrally inefficient and substantially non-flat within a band $\pm 1/T_C$, (c) a first modulator that modulates each bit of the analog baseband waveform signal with the unique signature waveform signal to yield a direct sequence spread waveform signal, (d) a first filter for filtering the direct sequence spread waveform signal, (e) an RF generator that generates an RF carrier signal, said RF carrier signal having a carrier frequency that is the same for all of said multiplicity of transmitters, (f) a second modulator that modulates said RF carrier signal with the filtered direct sequence spread waveform signal, and (f) a transmitter that transmits the modulated RF carrier signal; and (2) at least one base-station receiver comprising:

(a) an RF receiver that receives the transmitted modulated RF carrier signals from each of the multiplicity of transmitters, (b) a second filter that filters the modulated RF carrier signal to improve the signal-to-noise ratio (SNR) and to compensate for the spectrally inefficient substantially non-flat power spectrum of the signature waveform signal within the band $\pm 1/T_C$, and (c) a spread spectrum receiver that processes the filtered modulated RF carrier signal to despread such signal in order to identify a particular signature waveform signal contained therein, downconvert such signal to remove the RF carrier therefrom, and integrate such signal over a bit time to determine its informational content, said informational content over several bit times comprising the digital data transmitted by a particular one of said multiplicity of transmitters.

2. The DS-CDMA communication system as set forth in claim 1 wherein the spectrally-inefficient substantially non-flat power spectrum of the chip waveform signal is shaped as a main lobe of a sinc-squared function within the band $\pm 1/T_C$.

3. The DS-CDMA communication system as set forth in claim 2 wherein the first filter of each transmitter comprises a low pass filter having a frequency response band confined to the allowed channel bandwidth.

4. The DS-CDMA communication system as set forth in claim 1 wherein the second filter included within said base-station receiver comprises:

a matched filter having a frequency response that matches the non-flat power spectrum of the signature waveform signal, said modulated RF carrier signal being applied to an input of said matched filter; and an adaptive filter coupled to an output of said matched filter, said adaptive filter having a transfer function that compensates for the spectrally-inefficient substantially non-flat power spectrum of the signature waveform signal within the band $\pm 1/T_C$ so as to provide a net frequency response of the filter means that is substantially flat over the allowed channel bandwidth, said substantially flat frequency response serving to improve the SNR.

5. The DS-CDMA communication system as set forth in claim 2 wherein said adaptive filter comprises an analog transversal filter.

6. The DS-CDMA communication system as set forth in claim 2 wherein said adaptive filter comprises:

a series of $M-1$ delay elements, where M is an integer greater than three, each delay element having an input signal line and an output signal line, with the signal on the output signal line being delayed by $T_H$ seconds from the signal appearing at the input signal line, the input signal line of a first delay element being connected to the output of said matched filter;

a series of M tap points, with one tap point being located on each side of each delay element:

means for generating a set of tap weight signals $(\alpha_i)$;

a series of M multiplier elements, each having first and second input lines and an output line, the first input line being connected to a respective one of said tap points, and the second input line being connected to receive a respective one of the "tap weight" signals, the output line having a product signal thereon that represents the product of the signals applied to the first and second input lines; and a summing circuit coupled to the output lines of each multiplier element for accumulating all of the product signals generated by the multiplying means and producing an output signal representative of the sum of the product signals.

7. The DS-CDMA communication system as set forth in claim 6 wherein said means for generating a set of tap weight signals $(\alpha_i)$ includes a plurality of signal processing paths, each path including a multiplier element that multiplies the output signal by a tap point signal appearing on a respective one of said series of M tap points, a comparitor circuit that compares a product signal from the multiplier (110) with a specified reference signal $h_2$ and determines the difference therebetween, and an integrator circuit that integrates an output signal from the comparitor circuit over a specified time period, with the resulting integrated signal comprising one of said tap weight signals $\alpha_i$.

8. The DS-CDMA communication system as set forth in claim 6 wherein said integrator of each signal processing path comprises a low pass filter (LPF).

9. The DS-CDMA communication system as set forth in claim 2 wherein said adaptive filter comprises a discrete time adaptive filter.

10. A direct sequence code-division multiple-access (DS-CDMA) receiver for use with a plurality of transmitters, each transmitter being configured to asynchronously transmit a spectrally-inefficient CDMA signal $(s^{(k)}(t))$ at the same carrier frequency, said spectrally-inefficient CDMA signal having a substantially non-flat power spectrum within a band $\pm 1/T_C$, the CDMA signal transmitted by a particular transmitter having information data bits therein, of duration $T_B$, encoded with a unique signature waveform that identifies the particular transmitter as the source of its transmitted CDMA signals, the signature waveform comprising a train of chip pulses separated by a time period $T_C$, each having a polarity defined by a unique spreading code, with $N_C$ chip pulses being included within each data bit, whereby $N_C \times T_C = T_B$, the CDMA signals transmitted by any of said plurality of transmitters other than a transmitter of interest representing a form of noise, said DS-CDMA receiver including:

a front-end receiver that receives the spectrally-inefficient substantially non-flat CDMA signals transmitted by each of said transmitters within the band $\pm 1/T_C$;

a chip matched filter having a frequency response $H^*(\omega)$ matched to a frequency response of each of said transmitters, said matched filter being coupled to the front-end receiver so as to filter the CDMA signals received by said front-end receiver;

a sampling circuit that samples an output of said chip matched filter at a prescribed sampling rate and produces a series signal $x_m$; and an adaptive filter coupled to receive the series signal $x_m$ that generates an output series signal $y_m$ therefrom, said adaptive filter including means for compensating for the spectrally-inefficient substantially non-flat power spectrum of the CDMA signals within the band $\pm 1/T_C$ transmitted by a transmitter of interest so as to improve the signal-to-noise ratio (SNR) of the output series signal $y_m$;

a decimator that decimates the series signal $y_m$ and produces a series signal $z_n$;

a despreader that despreads the signal $z_n$ and identifies individual data bits that originated from a transmitter of interest; and means for determining the informational content of the individual data bits obtained from the despreader.

11. The DS-CDMA receiver of claim 10 wherein said adaptive filter comprises a two-sided finite impulse response (FIR) filter having L taps per side.

12. The DS-CDMA receiver of claim 11 wherein said adaptive filter comprises:

a series of $J-1$ delay elements, where J is an integer greater than two, each delay element having an input signal line and an output signal line, with the signal on the output signal line being delayed by an amount $T_H$ from the signal appearing at the input signal line, the input signal line of a first delay element being connected to the output of said chip matched filter;

a series of J tap points with one tap point being located on each side of each delay element;

means for generating a set of tap weight signals ($\alpha_j$);

a series of J multiplier elements; each having first and second input lines and an output line, the first input line being connected to a respective one of said tap points, and the second input line being connected to receive a respective one of the "tap weight" signals $\alpha_j$, the output line having a product signal thereon that represents the product of the signals applied to the first and second input lines; and a summer coupled to the output lines of each multiplier element for summing all of the product signals generated by the multiplying means and producing the series signal $y_m$ representative of the sum of the product signals.

13. The DS-CDMA receiver of claim 12 wherein said means for generating a set of tap weight signals ($\alpha_j$) includes a plurality of signal processing paths, each path including a first multiplier element that multiplies the series signal $y_m$ by a tap point signal appearing on a respective one of said series of J tap points, a summing circuit that sums a product signal from the first multiplier element, multiplied by a $-1$ to change its polarity, with a specified reference signal $h_2$, a second multiplier element that multiplies a sum signal generated by the summing circuit by a fixed constant $\Delta$, and an integrator circuit that integrates an output signal from the summing circuit over the time $T_C$, with the resulting integrated signal comprising one of said tap weight signals $\alpha_j$.

14. The DS-CDMA receiver of claim 13 wherein said discrete time adaptive filter implements the adaptive function $$a^{n+1}=a^n+\Delta\{h_2[0]-x[n](x^T[n]a^n)\} \quad (7)$$

where the constant $\Delta$ controls the rate of convergence of the adaptive function, $a^n$ represents the tap coefficients $\{a_{-L}, \ldots a_L\}$ of the FIR filter at time n, $x[n]$ is a vector that represents the set of signals present on the tap points at time n, and $h_2[0]$ is a vector representing the set of specified reference signals $h_2$ applied to each summing circuit (130) of each signal processing path.

15. A code-division multiple access (CDMA) communication system that detects with an approximately maximized signal-to-noise ratio (SNR) whether the bits of a transmitted data signal used within such system represent a logical "1" or a logical "0", said CDMA communication system including:

a plurality of transmitters, each of which includes means for transmitting data signals having information data bits therein of bit time $T_B$, encoded with a unique signature waveform, the signature waveform comprising a sequence of chip pulses separated by a time period $T_C$, each of said plurality of transmitters transmitting at the same data rate and chip rate as are transmitted by others of the transmitters at the same time;

means within each transmitter for generating the sequence of chip pulses to define a unique chip sequence within each bit time of the data signal to be transmitted, said unique chip sequence serving to identify a particular transmitter from which the transmitted signal originates;

means for shaping the chip pulses of each sequence of chip pulses so that each has a spectrally-inefficient, substantially non-flat power spectrum within a frequency band of $\pm 1/T_C$;

means for transmitting the shaped sequence of chip pulses as part of each data bit that is transmitted by the particular transmitter, whereby each data bit transmitted is encoded with said unique chip sequence;

a base-station receiver;

means within said base-station receiver for receiving the sequence of chip pulses;

matched filter means within the receiver for filtering the sequence of chip pulses in accordance with a matched filter transfer function configured to match the power spectrum of the transmitted chip pulses;

means for sampling the sequence of chip pulses passed through the matched filter at a specified rate to produce a sampled series of pulses, $x_m(i)$;

linear filter means for filtering the sampled series of pulses, $x_m(i)$, in accordance with a prescribed transfer function so as to produce a sequence of pulses $y_m(i)$, said prescribed transfer function being adapted to: (a) compensate for the spectrally-inefficient substantially non-flat shape of the power spectrum within the band $\pm 1/T_C$ of the transmitted pulses, (b) compensate for the transfer function of the matched filter, and (c) produce a net transfer function for the series of pulses $y_m(i)$ that is substantially flat over all frequencies within the allowed frequency band, thereby maximizing the SNR of the series $y_m(i)$; and means for determining whether the sequence of pulses $y_m(i)$ represents a data bit that is a logical "1" or a logical "0".

16. A method of detecting with a maximized signal-to-noise ratio (SNR) whether the bits of a transmitted data signal used within a code-division multiple access (CDMA) communications system represent a logical "1" or a logical "0", said CDMA communications system including a plurality of transmitters, each of which includes means for transmitting data signals at the same data rate and chip rate as may be transmitted by others of the transmitters at the same time, and a base-station receiver adapted to receive said transmitted data signals, said method comprising the steps of:

(a) generating a sequence of chip pulses separated by a time period $T_C$ that define a unique chip sequence within each bit time of the data signal to be transmitted, said unique chip sequence serving to identify a particular transmitter from which the transmitted signal originates;

(b) shaping the chip pulses of each sequence of chip pulses generated in step (a) so that each has a spectrally-inefficient substantially non-flat power spectrum within a frequency band $\pm 1/T_C$;

(c) transmitting the sequence of chip pulses shaped in step (b) as part of each data bit that is transmitted by the particular transmitter, whereby each data bit transmitted is encoded with said unique chip sequence;

(d) receiving the sequence of chip pulses at the receiver;

(e) passing the sequence of chip pulses received in step (d) through a matched filter, said matched filter having a transfer function adapted to match the power spectrum of the transmitted chip pulses;

(f) sampling the sequence of chip pulses passed through the matched filter in step (e) at a specified rate to produce a sampled series of pulses, $x_m(i)$;

(g) passing the sampled series of pulses, $x_m(i)$, through a linear filter to produce a sequence of pulses $y_m(i)$, said liner filter being configured to exhibit a transfer function that compensates for the spectrally-inefficient substantially non-flat shape of the power spectrum of the transmitted pulses within the frequency band $\pm 1/T_C$, as well as the transfer function of the matched filter, to produce a net transfer function for the series of pulses $y_m(i)$ that is substantially flat over all frequencies within the frequency band $\pm 1/T_C$, thereby maximizing the SNR of the series $y_m(i)$; and (h) determining whether the sequence of pulses $y_m(i)$ represents a data bit that is a logical "1" or a logical "0".

17. The method of claim 16 wherein step (g) comprises successively delaying the sampled series of pulses, $x_m(i)$, by an amount $T_H$ using a series of $J-1$ delay elements ($122_j$), where J is an integer greater than three;

picking off the delayed sampled series of pulses as they pass through said delay elements ($122_j$) at a series of J tap points ($123_j$), with one tap point being located on each side of each delay element $122_j$;

generating a set of tap weight signals ($a_j$);

multiplying a respective one of said picked off series of pulses available at said tap points ($123_j$) by a respective one of the "tap weight" signals $a_j$ to produce a respective product signal; and summing all of the respective product signals to produce the series signal $y_m$.

18. The method of claim 17 wherein the step of generating a set of tap weight signals ($a_j$) comprises:

multiplying the series signal $y_m$ by a tap point signal appearing at each of said series of J tap points ($123_j$) to produce a series of first product signals;

multiplying the series of first product signals by $-1$ to reverse its polarity;

summing the first product signals, after multiplying by $-1$ to change their polarity, with a specified reference signal $h_2$ to produce a series of difference signals;

multiplying the difference signals by a fixed constant $\Delta$ to produce a series of second product signals; and integrating each of the series of second product signals over the time $T_C$ to produce said set of tap weight signals $a_j$.

19. The method of claim 18 wherein step (g) comprises implementing the adaptive algorithm $$a^{n+1} = a^n + \Delta\{h_2[0] - x[n](x^T[n])\} \tag{7}$$

where the constant $\Delta$ controls the rate of convergence of the adaptive algorithm, $a^n$ represents the set of tap weight coefficients $\{a_{-L}, \ldots a_L\}$ at time n, $x[n]$ is a vector that represents the set of signals present on the tap points ($123_j$) at time n, and $h_2[0]$ is a vector representing the set of specified reference signals $h_2$ summed with the first product signals lo produce the series of difference signals.

* * * * *